(12) United States Patent
Day

(10) Patent No.: US 11,473,668 B2
(45) Date of Patent: Oct. 18, 2022

(54) DRIVE CHAIN LUBRICATION SYSTEM AND METHOD

(71) Applicant: Steve Day, Fresno, CA (US)

(72) Inventor: Steve Day, Fresno, CA (US)

( * ) Notice: Subject to any disclaimer, the term of this patent is extended or adjusted under 35 U.S.C. 154(b) by 346 days.

(21) Appl. No.: 16/821,927

(22) Filed: Mar. 17, 2020

(65) Prior Publication Data

US 2021/0293328 A1 Sep. 23, 2021

(51) Int. Cl.
*F16H 57/05* (2006.01)
*B62J 31/00* (2006.01)
*F16H 57/04* (2010.01)

(52) U.S. Cl.
CPC ....... *F16H 57/0456* (2013.01); *F16H 57/045* (2013.01); *F16H 57/0427* (2013.01); *F16H 57/05* (2013.01); *B62J 31/00* (2013.01)

(58) Field of Classification Search
CPC .... F16H 57/05; F16H 57/045; F16H 57/0427; F16H 57/0456; B62J 31/00
USPC ........................................................ 184/6.12
See application file for complete search history.

(56) References Cited

U.S. PATENT DOCUMENTS

| | | | |
|---|---|---|---|
| 3,720,289 A | 3/1973 | Moldenhauer | |
| 3,939,730 A | 2/1976 | DeHaan | |
| 4,158,402 A | 6/1979 | Romans | |
| 5,186,280 A * | 2/1993 | Mattcheck | B65G 45/08 |
| | | | 184/15.3 |
| 5,269,614 A * | 12/1993 | Taylor | B62J 31/00 |
| | | | 401/9 |
| 5,360,084 A * | 11/1994 | Graf | B08B 1/02 |
| | | | 184/15.3 |
| 6,679,352 B2 | 1/2004 | Gillespie | |
| 8,919,500 B1 | 12/2014 | Kilcrease et al. | |
| 2003/0079944 A1 * | 5/2003 | Gillespie | F16N 3/02 |
| | | | 184/80 |

FOREIGN PATENT DOCUMENTS

| | | |
|---|---|---|
| CA | 2894682 | 4/2018 |
| CN | 2224953 Y | 4/1996 |
| CN | 201080998 Y | 7/2008 |
| CN | 201103783 Y | 8/2008 |
| EP | 1780107 A2 | 5/2007 |

(Continued)

OTHER PUBLICATIONS www.scottoiler.com/us/, chain oiling system products, copyrighted 2020.

*Primary Examiner* — Gene O Crawford
*Assistant Examiner* — Emily R Kincaid
(74) *Attorney, Agent, or Firm* — Sierra IP Law, P.C.; Mark D. Miller

(57) ABSTRACT

The present invention provides lubrication systems, apparatus and methods for efficiently and reliably lubricating the drive chain and drive sprocket of a chain-driven vehicle during operation. Embodiments of the invention include a body having a reservoir of lubricating oil that is attachable to the vehicle using existing mounting bolts, a valve for controlling a flow of the oil to the sprocket and chain, a channel providing fluid communication between the reservoir and the valve, and an applicator for applying the lubricating oil to a drive sprocket of the vehicle. Oil is transferred via gravity from the reservoir to the applicator, and via centrifugal force from the applicator to the sprocket and chain.

18 Claims, 11 Drawing Sheets

(56) References Cited

FOREIGN PATENT DOCUMENTS

| GB | 613221 | A | * | 11/1948 | | |
| GB | 2449878 | A | | 12/2008 | | |
| KR | 20110002713 | | * | 1/2011 | | |
| WO | WO-2017017403 | A1 | * | 2/2017 | .............. | B62J 31/00 |

* cited by examiner

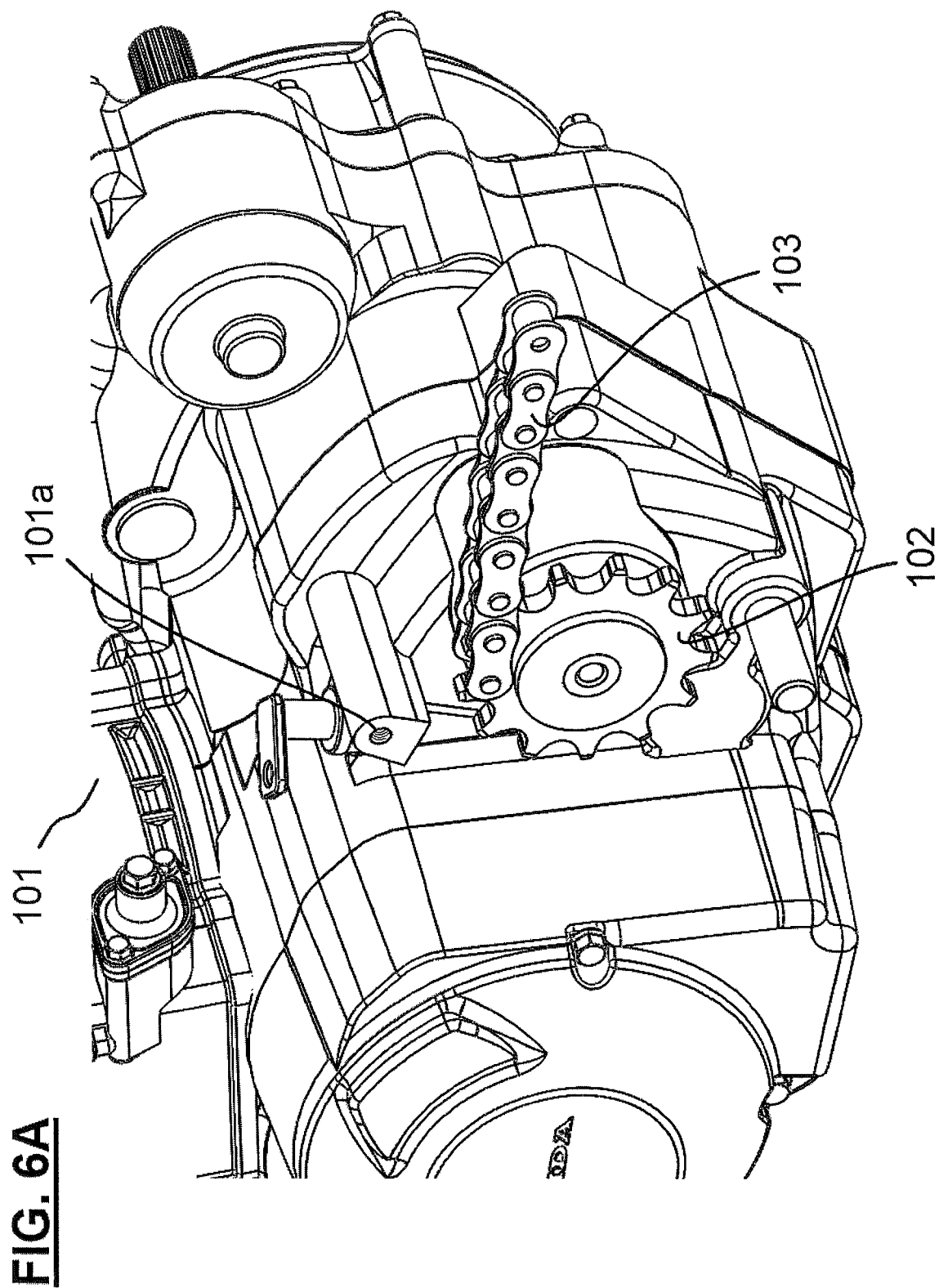

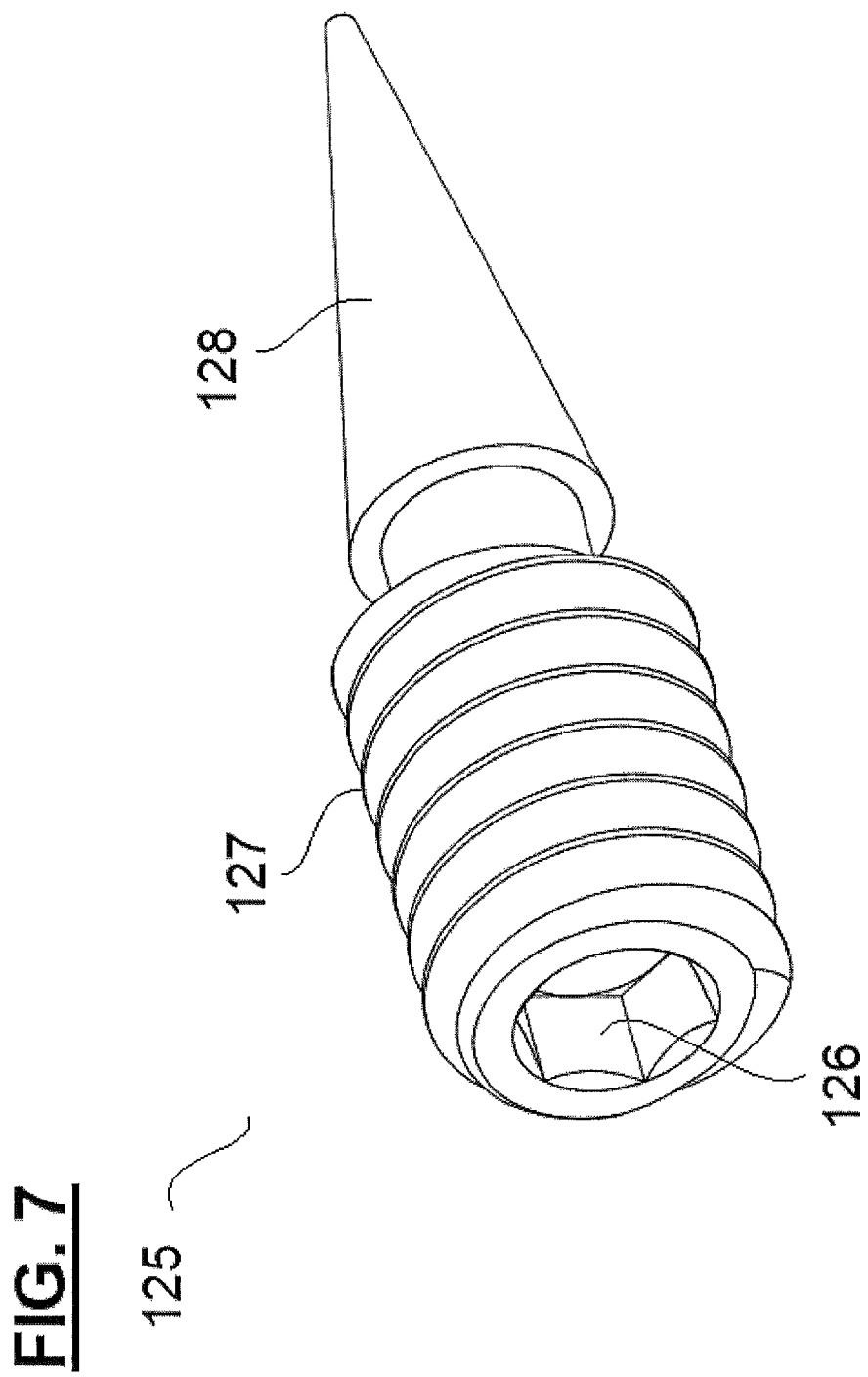

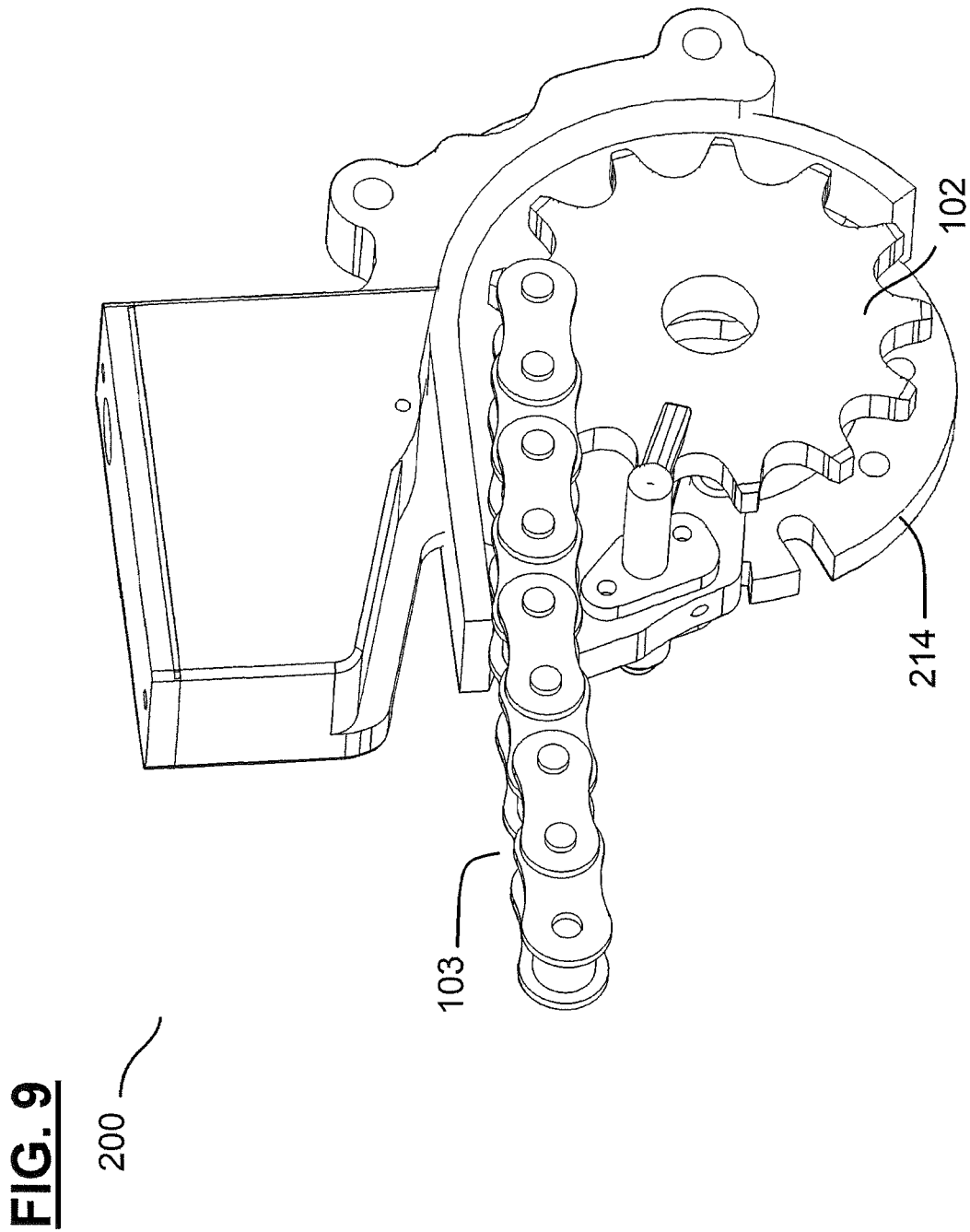

DRIVE CHAIN LUBRICATION SYSTEM AND METHOD

FIELD OF THE INVENTION

The present invention relates generally to lubrication of moving parts in a machine, and more specifically to a system for lubricating the primary drive chain of a chain-driven vehicle such as a motorcycle.

BACKGROUND OF THE INVENTION

The statements in this section merely provide background information related to the present disclosure and may not constitute prior art.

Drive chains on motorcycles and other similar chain-driven vehicles require proper lubrication in order to increase the life of the chain and the corresponding sprockets or gears that make contact with the chain. Lubrication of the drive chain helps to prevent wearing and thinning, rusting or other corrosion, and potential breakage of the links of the chain. Regular lubrication is particularly crucial for off-road vehicles and those vehicles whose chains are exposed to the environment, as their drive chains frequently come into contact with moisture, dirt, sand, and other corrosive or abrasive substances which can speed up the degradation of such chains.

Preferably, a controlled thin coating of lubrication should be deposited uniformly and frequently to the chain at multiple locations to keep the chain properly and continuously lubricated. Conventional methods for lubricating a drive chain include manually applying oil or other lubrication to one or more of locations along a stationary chain. These methods and devices often fail to properly or adequately lubricate all of the chain.

An alternative method involves strapping an oil reservoir onto a support member of the frame of the vehicle, the reservoir having a nozzle operable to apply oil to the chain while the vehicle is in operation, thus hitting multiple locations on the revolving chain without having to move the nozzle. However, such devices have several drawbacks which make them unreliable and undesirable. A major problem with such oil reservoir applicators is that the devices themselves are often complicated, with parts such as electrical motors, pressurized containers, and spraying devices which must be hooked up to the electrical system of the vehicle in order to function. These may be difficult to install properly, and may therefore not function properly; and they may fail if there are any electrical malfunctions. In addition, such systems are often mounted to the vehicle by drilling into—and thereby compromising—a support member; or they are only semi-permanently attached to the vehicle via Velcro, zip-ties, or the like which may loosen or fail over time. Further, use of a strap may not be possible if the vehicle does not have a preexisting and relatively slender support member adjacent to the drive sprocket. Such devices are often expensive, difficult to install, and require frequent maintenance themselves due to the bumpy ride provided by an off-road vehicle. The powered mechanisms of such methods may overapply oil, leaving a messy operation. Or, due to high winds and bumpy rides provided by the vehicle, their nozzles may become misaligned, or the oil may be blown away before reaching the chain, thereby under-lubricating the chain. In short, these devices are unreliable.

Conventional (manual) devices may also fail to adequately oil the drive sprocket of a chain-driven vehicle, the teeth of the sprocket interdigitating between the links of the drive chain and representing the primary source of wear on the chain. Conventional devices rely on the oil applied to the exposed exterior outside surface of the drive chain to lubricate the interaction between the chain's links and the sprocket's teeth. However, the drive chain of an operating vehicle is revolving around the drive sprocket at high speed. Centrifugal force is therefore acting on the oil, pulling it toward the outer side of the chain and away from the teeth of the sprocket, leaving little lubrication for the interaction between the sprocket teeth and chain links.

Thus, a primary chain lubrication system is needed that is reliable, efficient and easy to install, and which overcomes the deficiencies of conventional systems.

SUMMARY OF THE INVENTION

The present invention provides a lubrication system and method for reliably and efficiently lubricating the drive chain and drive sprocket of a chain-driven vehicle during operation. The system may be applicable to any chain-driven vehicle, and in particular may be applicable to a vehicle such as a street motorcycle, an off-road motorcycle, a dual-sport motorcycle, a scooter, a motor-assisted bicycle, a three-wheeled motorcycle, a three-wheeled ATV, a four-wheeled ATV, and another similar chain-driven vehicles. Embodiments of the system may include a body for holding a reservoir of lubricating media such as oil, one or more channels leading to one or more applicators for applying the lubricating media to a drive sprocket and chain of the vehicle, and a valve for controlling a flow of the lubricating media.

In embodiments of the invention, the body may define a reservoir for holding the volume of lubricating media such as oil, the reservoir having a closable inlet for adding lubricating media and an outlet, the outlet being in fluid communication with a channel leading from the reservoir to a valve. Embodiments of the applicator may have multiple application outlets (e.g., a forked applicator with an outlet at the end of each arm of the fork) and may be operable to apply a consistent volume of lubricating media to both sides of the primary drive sprocket (i.e., the exterior surfaces of opposite sides of the sprocket) during operation of the vehicle. Centrifugal force acting on the lubricating media due to the spinning sprocket may then drive the lubricating media radially outward to both the inner and outer surfaces of the teeth of the sprocket, and subsequently onto the drive chain of the vehicle. The lubricating media may thus be applied to the inside of the chain (e.g., the radially inner side of the chain which comes into direct contact with the sprocket), and centrifugal force may then pull the lubricating media through and to the outside of the chain (e.g., the radially outer side of the chain which does not come into direct contact with the sprocket).

Some of the lubricating medium which is applied to the inside of the chain may then be transferred from the chain to a secondary sprocket of the vehicle (e.g., a sprocket at a wheel of the vehicle which allows transfer of power from the chain to the wheel) as the chain revolves during operation of the vehicle. Embodiments of the present system may thus be operable to apply a lubricating media evenly and in a flow-adjustable manner to both sides of the drive sprocket, to the teeth of the drive sprocket, to the insides and outsides of the links of the drive chain, and to other drive sprockets that the drive chain comes into contact with, thereby lubricating all important surfaces involved the drive chain assembly, minimizing the primary source of wear to each of these parts. Embodiments of the present system are thereby superior to conventional systems which apply chain oil only to the outside of a primary chain and thus fail to adequately lubricate: 1) the inside of the links of the chin; 2) the teeth of the primary drive sprocket; and 3) the teeth of any secondary sprockets of the vehicle. In some embodiments, the body may be secured to the vehicle adjacent to the secondary sprocket, and the applicator may be positioned to deliver the lubricating media to a proximal surface and a distal surface of the secondary sprocket.

Embodiments of the lubrication system of the present invention may be operable to be powered by gravity rather than utilizing a power system of the vehicle. For example, and without limitation, the body may be shaped such that, when mounted to a vehicle in an upright position, the reservoir is positioned higher than the channel, the channel being arranged to lead downward from the reservoir to the valve, and the valve being positioned substantially above the outlets of the applicator. Thus, gravity may pull the lubricating media from the reservoir, down through the channel to the valve, down through the valve to the applicator, and down out of the outlets of the applicator onto the drive sprocket. As a result, these embodiments of the invention may not require complicated parts which create pressure in the reservoir of the body, nor the need to pump lubricating media through the valve in order to apply the lubricating media. Accordingly, these embodiments need not be connected to a power system of the vehicle (e.g., the electrical system or a mechanical or pneumatic system of the vehicle) in order to provide power to such parts.

Embodiments of the present system may be operable to allow a user (e.g., a rider, driver, or passenger of the vehicle) to adjust the flow of lubrication during operation of the vehicle via an easily accessible and adjustable valve. Embodiments of such a valve may be accessible for adjustment without the need to unlock or remove a cover or other protective device.

Embodiments of the system may be operable to be mounted to the vehicle via an existing attachment point of the vehicle, avoiding the need to drill into or a support structure of the vehicle or utilize a strap such as Velcro or a zip tie. Installation of the system may thereby avoid the extensive effort or precision required to prevent damaging the vehicle with a drill, and potentially compromising the strength of the support structure. Such embodiments may also avoid misalignment of the system during a bumpy ride, which a strap may lack the strength to prevent.

Embodiments of the attachment point for the body containing the reservoir may comprise one or more existing threaded bolt-holes of the vehicle normally utilized for mounting another part, such as a sprocket cover or heat shield. In some embodiments, the body may be positioned to cover at least a portion of the drive sprocket and/or drive chain of the vehicle when system is mounted to such existing attachment points. In other embodiments, the system may further comprise a shield, the shield providing mechanical protection for the drive sprocket and drive chain. The shield may be arranged so as to cover at least a portion of the drive sprocket and/or drive chain when an embodiment of the invention is installed on the vehicle. The shield may thereby reduce contact with dirt, mud, or other contaminants, and prevent contact between the body and the clothing of a user, thus preventing injury to the user and damage to the vehicle.

Most embodiments of the present invention may include the following components: a body containing a reservoir, one or more members for attaching the body to the vehicle, a channel leading from the reservoir to an adjustable valve, and an applicator.

Embodiments of the body may comprise a unit operable to be mounted to a vehicle and hold a volume of lubricating media. In some embodiments, the body may comprise a reservoir for holding a volume of lubricating media, one or more attachment points for securing the body to the vehicle, an optional sprocket cover for shielding at least a portion of the drive sprocket and chain, and an internal channel connecting an outlet from the reservoir to an adjustable valve. In some embodiments, the reservoir may comprise an inlet for accepting lubricating media (e.g., an opening in the top of the reservoir for pouring lubricating media into the reservoir) and an outlet in fluid communication with the channel (i.e., an opening in the bottom of the reservoir leading to the channel). Embodiments of the reservoir may comprise any shape advantageous for holding a volume of lubricating media. In some embodiments, the reservoir may comprise at least one of a substantially cubic shape, a cubic shape with at least one elongated dimension (i.e., a rectangular polyhedron), another substantially polyhedral shape, a cylindrical shape, a spherical shape, a cylinder with rounded ends, and another similar shape.

In some embodiments, the body may comprise a lid, the lid being operable to removably cover and seal the inlet of the reservoir. In some embodiments, the lid may be press-fit into the inlet. In other embodiments, the lid may attach to the body via securing member (e.g., a screw, a clamp, a clip, a hinge, or the like). In yet other embodiments, the lid may comprise a cap having a threading complementary in shape to a threading of the inlet. In some embodiments, the lid may comprise a bead operable to contact a surface of the inlet, providing a watertight seal.

In some embodiments, the reservoir may include a governing device or check valve. The governing device may be any device operable to limit the flow of lubricating media through the outlet of the reservoir, thus limiting the flow of lubricating media delivered to the drive sprocket. In some embodiments, the outlet may comprise a round opening and the governing device may comprise a sphere having a diameter substantially greater than the diameter of the opening. Thus, the sphere may be operable to sit in the opening (i.e., a lower portion of the sphere may nest in the opening), creating a seal between an outer surface of the sphere and an inner edge running round the circumference of the opening. In some embodiments, the outer surface of the sphere may comprise a material operable to create a watertight seal with the opening (e.g., a rubber, a plastic, and the like). In some embodiments, the edge of the opening may comprise a sealing member for improving the seal between the opening and the sphere. In some embodiments, the sealing member may comprise an o-ring. In some embodiments, the sealing member may comprise a material operable to create a watertight seal with the sphere (e.g., a rubber, a plastic, and the like).

Embodiments of the outlet may be positioned at a low point of the reservoir (e.g., in the bottom side of a substantially polyhedral shaped reservoir), such that gravity pulls the sphere into a nesting position with the outlet, creating a seal and cutting off the flow of the lubricating media through the outlet when the vehicle is at rest. This prevents the reservoir from draining out when the vehicle is not in use. During operation of the vehicle, the sphere may be knocked out of the sealed, nesting position due to G-forces, vibrations, bumps and other ride events, allowing a limited amount of lubricating media to be exit the reservoir and be delivered to the drive sprocket. The check valve may thus be operable to prevent the flow of the lubricating media while the vehicle is not in operation (i.e., when a flow of lubricating media is not needed), and allow the flow of the lubricating media during operation of the vehicle (i.e., when lubricating media is beneficial for the drive sprocket and chain), using only the force of gravity and the vibration of the vehicle to control the position of the check valve. The check valve may thereby prevent waste of lubricating media, and prevent over-lubrication of the drive sprocket and chain. Further, the check valve may thereby increase lubrication during a more bumpy ride (as the sphere will naturally spend more time out of the nesting position during a bumpy ride), when the sprocket and chain are more likely to benefit from increased lubrication due to increased dirt, mud, and other contaminants being tossed up and into contact with the sprocket and chain.

Embodiments of the body may comprise one or more attachment members for securing the body to the vehicle. In some embodiments, the attachment members may comprise one or more bolt holes that correspond to existing bolt holes on the vehicle, such as those used to attach a sprocket cover or shield to the vehicle. Each bolt hole in the body may have a diameter substantially similar to an existing corresponding bolt hole of the vehicle. Each bolt hole may have a smooth interior bore allowing an attachment bolt to simply pass through before engaging with the vehicle; or it may have a threaded interior that is complementary to the threading of the existing bolt hole of the vehicle, so that a bolt may be threadably engaged with a bolt hole of the body and with the corresponding bolt hole of the vehicle, securing the body to the vehicle. In some embodiments, the attachment member may comprise a plurality of bolt holes arranged so that each may align with one of a plurality of existing bolt holes of the vehicle, and a plurality of bolts may be utilized to secure the body to the vehicle. In other embodiments, the attachment member may comprise at least one of a bolt hole, a clip, a clamp, a flange, a tab, and the like, or combinations thereof.

Embodiments of the body may comprise a sprocket cover. In some embodiments the sprocket cover may be operable to shield at least a portion of a sprocket and chain of the vehicle from contact with wind, and with foreign objects such as contaminants, bugs, the user's body or clothing, and other similar objects. In some embodiments, the sprocket cover may shield substantially at least the upper portion of the drive sprocket, including the portion of the drive sprocket to which the applicator applies lubricating media. The sprocket cover may thus also act as a shield against excess lubricating media being flung off of the drive sprocket and/or drive chain, keeping the lubricating media from depositing on other parts of the vehicle or onto the user or the user's clothing. In some embodiments, the sprocket cover may comprise a substantially circular shape operable to cover substantially all of the drive sprocket, further shielding the drive sprocket and drive chain from contact with foreign objects. In some embodiments, the sprocket cover may encompass a channel leading from the reservoir to a valve or applicator, and the sprocket cover may support the reservoir, attachment member(s), valve, and/or applicator.

Embodiments of the valve may comprise any suitable valve or device operable to control a flow of lubricating media therethrough (e.g., passing from the channel to the applicator). In some embodiments, the valve may comprise at least one of a globe valve, a gate valve, a ball valve, a butterfly valve, a diaphragm valve, a plug valve, a pinch valve, a needle valve, another similar valve, and the like. The present invention may thus allow for adjustment of a flow of lubricating media being delivered to the drive sprocket without the need to communicate with or otherwise utilize a power system of the vehicle. The valve may have an adjustment member which may be accessible by hand while the user is operating, occupying, or standing next to the vehicle. In some embodiments, the valve adjustment member may be electronically operated such as, without limitation, a solenoid or the like.

Embodiments of the valve adjustment member may comprise any device operable to control a position of the valve and allow for adjustment thereof. In some embodiments, the valve adjustment member may comprise a bolt having an adjustment head, a threading, and a valve end. The adjustment head may be adjustable by hand (e.g., a wing screw head, a hex bolt head, a lever, or another similar device which is easily manually adjusted), or the adjustment head may require a simple tool for adjustment (e.g., a hex key or Allen wrench for a head comprising a six-sided depression, an open-end wrench for a hex bolt head, or another similar device for providing leverage to adjust the adjustment head). The threading of the adjustment member may have a shape which is complementary to a shape of a threading of a passage in the body (e.g., a bolt hole) in communication with a valve chamber. The valve end of the adjustment member may comprise a shape which is complementary to a shape of the valve chamber, the valve end being operable to make contact with a wall of the valve chamber in order to cut off flow of the lubricating media through the valve. In some embodiments, the valve end and valve chamber may each comprise a conical or frustoconical shape (e.g., a needle valve).

In other embodiments, the adjustment member may comprise an adjustment head, a medial member (e.g., a stem) without a threading, and a valve end. In some embodiments, the adjustment head may comprise a lever perpendicular to a central axis of the medial member, and the valve end may comprise a passage through the medial member. In some embodiments, the passage may have a central axis substantially perpendicular to the central axis of the medial member (e.g., a plug valve). It is to be appreciated that the valve adjustment member may be manually operated by the user, such as, without limitation, rotating, sliding, pulling or pushing on a head of a valve control member. It is also to be appreciated that the valve adjustment member may be electronically operated using, without limitation, one or more motor(s), solenoid(s), toggle(s) or other electronically activated components to open, close or adjust the valve. Such components may be operated using one or more electronic controls or switches located at a suitable place within reach of the operator, such as without limitation on the vehicle body, dashboard display or handle bars.

Embodiments of the lubricant applicator may comprise any device operable to direct the lubricating media from the valve (or a passage downstream of the valve) to the drive sprocket of the vehicle. Embodiments of the applicator may comprise a passage having a proximal opening in communication with an incoming flow of lubricating media from the valve, and a distal opening positioned adjacent to or in contact with a surface of the drive sprocket such that the distal opening is operable to direct lubricating media to the surface of the drive sprocket. Embodiments of the applicator may comprise any rigid or semi-rigid material operable to form a passage for directing the lubricating media. In some embodiments, the applicator may comprise at least one of a metal (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, carbon fiber, graphene, or other similar rigid or semi-rigid materials.

In some embodiments, the applicator may comprise a base for connecting to the body or valve, and an applicator tip comprising one or more distal openings, the base comprising a first material and the applicator tip comprising a second material. In some embodiments, the first material may be more rigid and/or durable than the second material, to allow for secure attachment to the body. In some embodiments, the second material may be more flexible so as to be non-damaging to the drive sprocket due to contact therewith (e.g., the base may comprise a metal, metal alloy, or the like and the applicator tip may comprise a deformable plastic, rubber, or the like).

In some embodiments, the applicator may comprise a forked passage having a plurality of distal openings, each of the distal openings being positioned adjacent to or in contact with a surface of the drive sprocket. In some embodiments, the plurality of distal openings may comprise a first distal opening and second distal opening, the first distal opening being positioned adjacent to or in contact with a first surface of the drive sprocket and the second distal opening being positioned adjacent to or in contact with a second (opposite) surface of the drive sprocket. In some embodiments, the first surface may comprise the proximal surface of the drive sprocket as described herein, and the second surface may comprise the distal surface of the drive sprocket, as described herein. In some embodiments, the applicator may comprise a third distal opening. In some embodiments, the third distal opening may be positioned adjacent to the drive chain (e.g., above the drive chain) such that lubricating media is directed to the drive chain. In some embodiments, the applicator may comprise four or more distal openings.

In some embodiments, the plurality of distal openings may be operable as redundancies for each other, wherein if a first distal opening becomes blocked or damaged, the drive sprocket and drive chain may still receive lubricating media from a second distal opening. In such embodiments, the first distal opening and the second distal opening may each be positioned to deliver lubricating media to the same side of the drive sprocket, acting as redundancies for each other, while at least a third distal opening may be arranged to deliver lubricating media to an opposite side of the drive sprocket. In some embodiments, a third and a fourth distal opening may be positioned to deliver lubricating media to the opposite side of the sprocket, wherein the third and fourth distal openings act as redundancies for each other.

A method of using the system of the present invention may comprise the steps of: providing device for delivering lubricating media to a chain of a vehicle, the device comprising a body, a valve, and an applicator, the body including a reservoir having a channel leading to the valve and applicator, and an attachment member, the valve having an adjustment member, and the applicator having a forked shape and a plurality of distal openings; securing the body to the vehicle via the attachment member; adding lubricating media to the reservoir; and adjusting a position of the valve via the adjustment member.

In some embodiments, the method may further comprise the step of operating the vehicle. In some embodiments, the method may further comprise the step of readjusting the valve via the adjustment member. In some embodiments, the method may further comprise the step of providing a governing device (check valve) in the reservoir for limiting a flow of the lubrication media. In some embodiments, the step of securing the body to the vehicle via the attachment member may comprise threading a bolt through the attachment member and into an existing bolt hole of the vehicle. In some embodiments, the method may further comprise attaching an electronic actuator to the valve, and connecting the actuator to a control that is accessible by the user during operation of the vehicle such that the valve may be adjusted using the control.

These and other features and objects of the invention will be apparent from the description provided herein.

It is therefore an object of the present invention to provide efficient and reliable lubrication to a drive chain of a vehicle or machine and the corresponding sprockets in contact with the chain, in order to increase the useful life of these components.

It is a further object of the present invention to provide efficient and reliable lubrication to a drive chain of a vehicle to prevent wearing and thinning, rusting or other corrosion, and eventual breakage of the links of the chain.

It is a further object of the present invention to provide efficient and reliable lubrication to the drive chain and corresponding sprockets of off-road vehicles whose chains are exposed to the environment, as their drive chains frequently come into contact with moisture, dirt, sand, and other corrosive or abrasive substances which can speed up the degradation of such chains.

It is a further object of the present invention to provide a chain and sprocket lubrication device which efficiently and reliably lubricates the interaction points between the teeth of the sprockets and the links of the chain.

It is a further object of the present invention to provide a simple chain and sprocket lubrication device with few parts, embodiments of which do not need to tap into a power system of the vehicle.

It is a further object of the present invention to provide a chain and sprocket lubrication device with few parts and which is powered by gravity.

It is a further object of the present invention to provide a chain and sprocket lubrication device which allows for adjusting a flow of lubrication to the chain and sprocket.

It is a further object of the present invention to provide a simple chain and sprocket lubrication device with few parts, embodiments of which may utilize one or more electronic controls to operate an applicator valve.

It is a further object of the present invention to provide a chain and sprocket lubrication device which is operable to securely attach to a vehicle via one or more existing attachment points of the vehicle, avoiding the need to drill into the vehicle.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 6A shows a perspective view of a portion of a chain driven vehicle without a lubrication system installed thereon.

FIG. 7 shows a perspective view of a valve adjustment device of a system for lubricating a drive chain and drive sprocket of a chain-driven vehicle, according to an embodiment of the present invention.

FIG. 9 shows a rear, perspective view of an apparatus for lubricating the drive chain and drive sprocket of a chain-driven vehicle, according to an alternative embodiment of the present invention.

DETAILED DESCRIPTION

Figure 1:
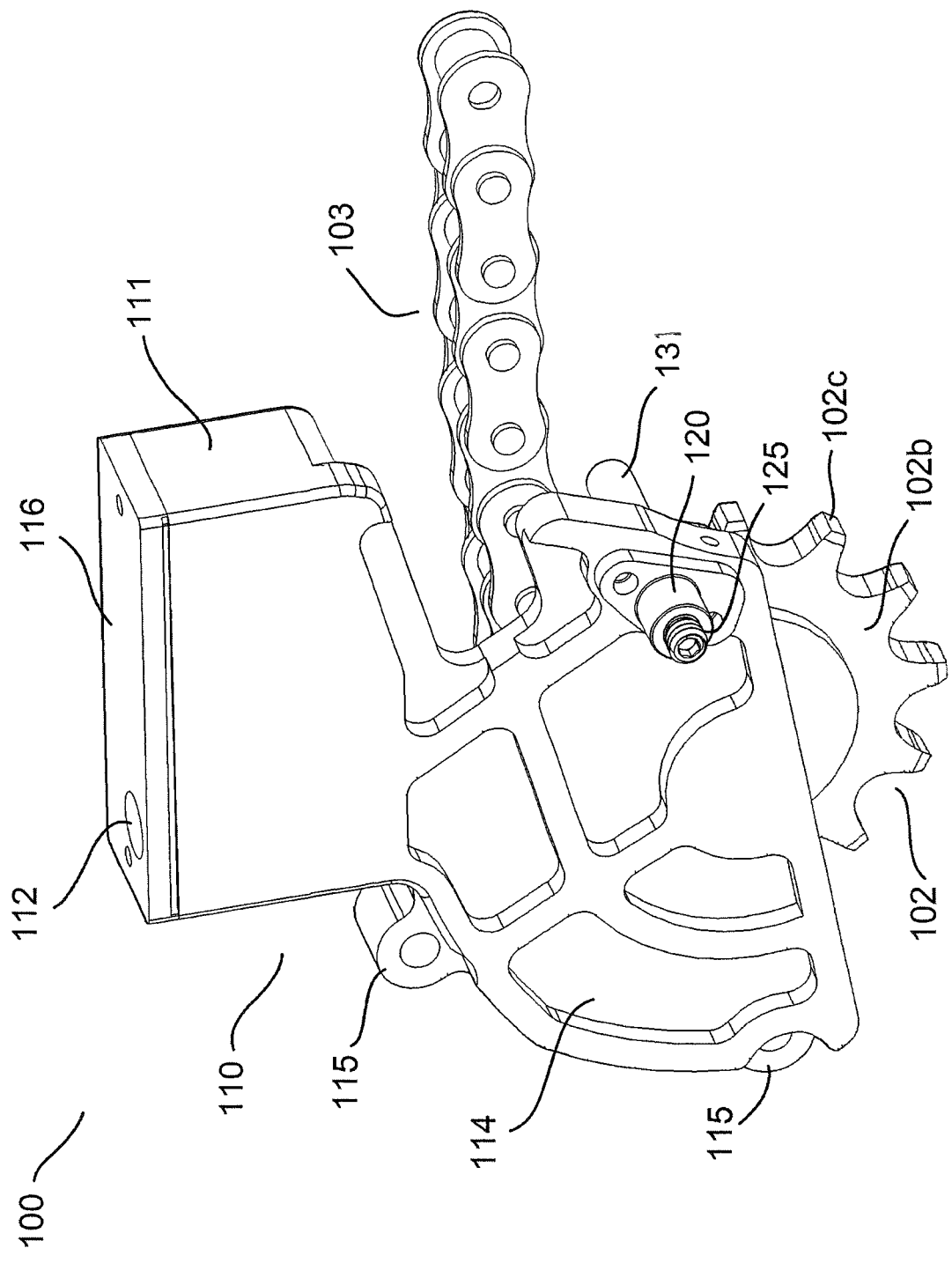
FIG. 1 shows a front perspective view of an apparatus for lubricating a drive chain and drive sprocket of a chain-driven vehicle, according to an embodiment of the present invention.
Figure 2:
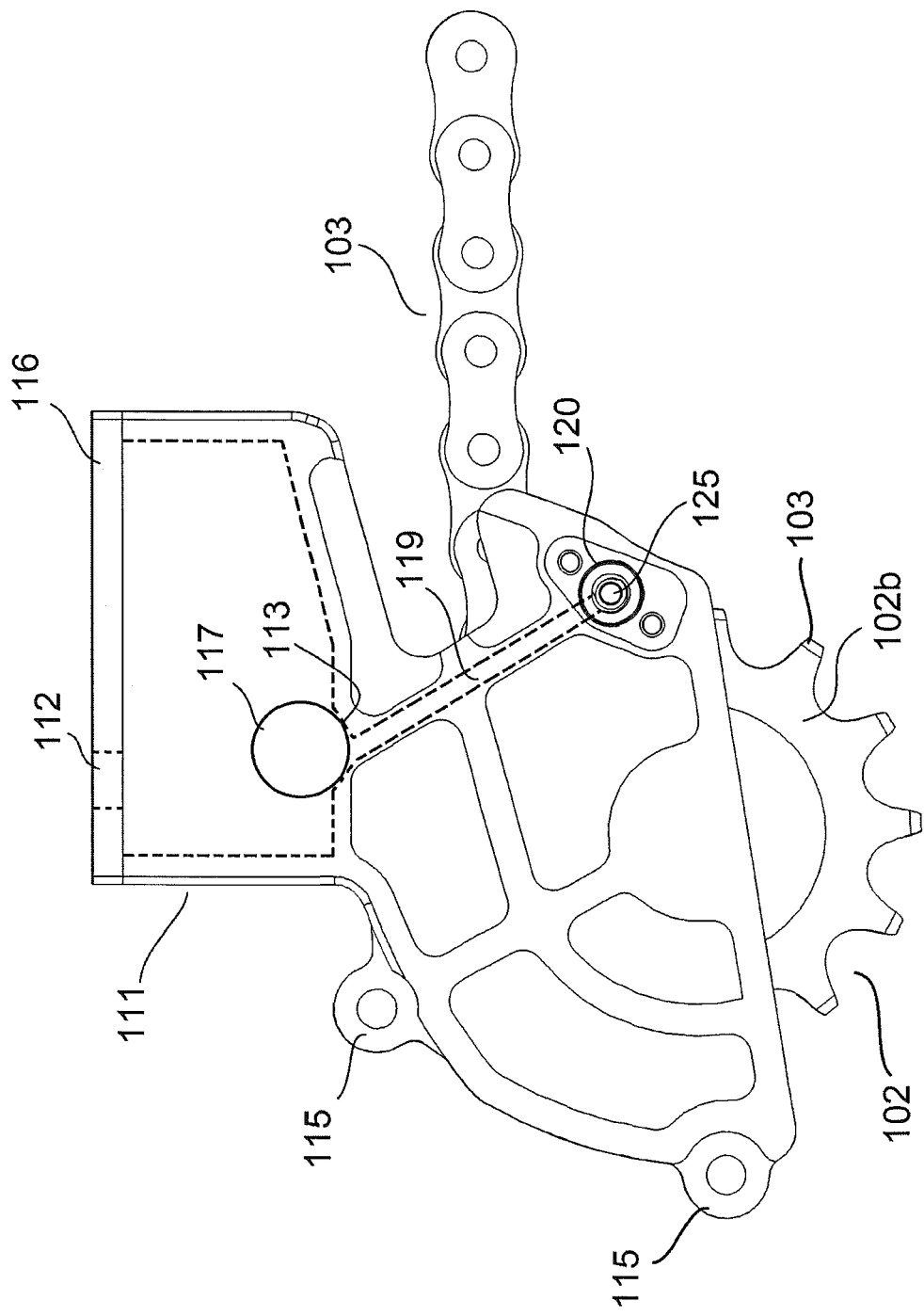
FIG. 2 shows a side view of an apparatus for lubricating a drive chain and drive sprocket of a chain-driven vehicle, according to an embodiment of the present invention.
Figure 3:
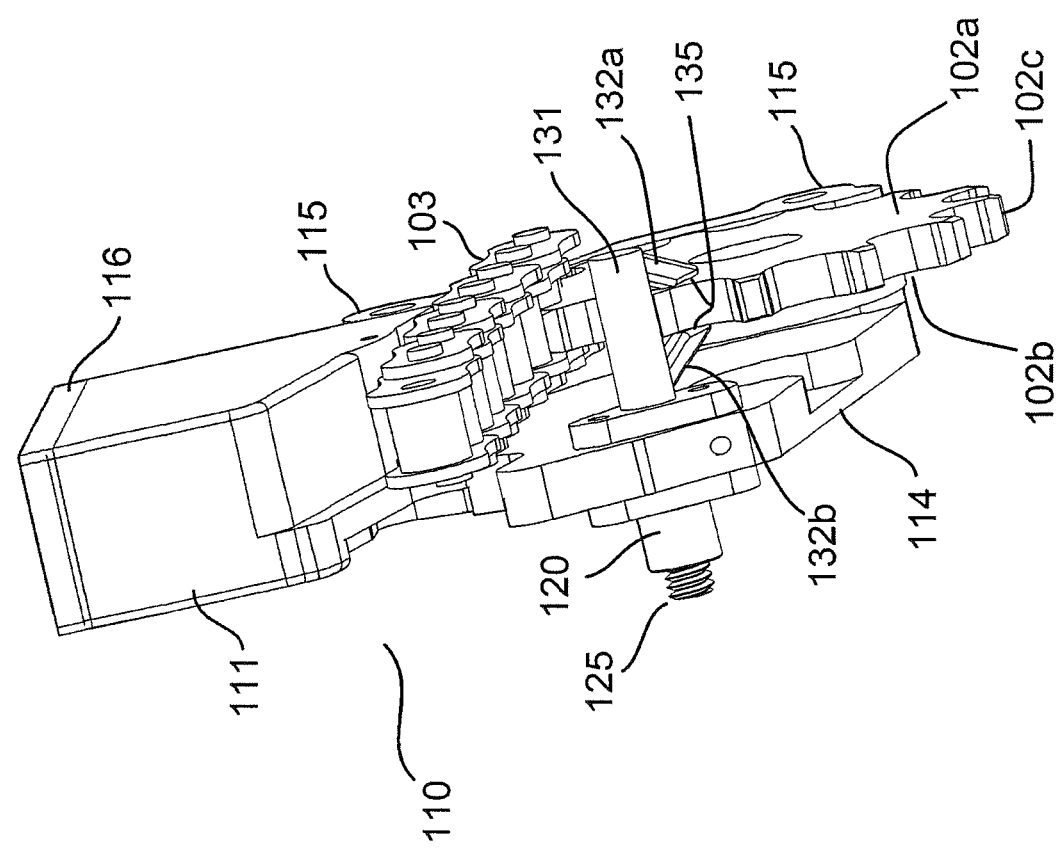
FIG. 3 shows a rear perspective view of an apparatus for lubricating a drive chain and drive sprocket of a chain-driven vehicle, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

The present invention concerns embodiments of lubrication systems, apparatus and methods for efficiently and reliably lubricating the drive chain and drive sprocket of a chain-driven vehicle during operation. Embodiments of the apparatus may include a body having a reservoir for holding a volume of lubricating media, a valve for controlling a flow of the lubricating media, a channel providing fluid communication between the reservoir and the valve, and an applicator for applying the lubricating media to a drive sprocket of the vehicle.

As seen in FIGS. 1-5 the illustrated exemplary embodiment of the apparatus 100 may include the following major components: a body 110, a valve 120 having an adjustment member 125, and an applicator 130 for delivering lubricating media to a drive sprocket 102 and drive chain 103 of a vehicle 101, the body 110 having a reservoir 111 for holding lubricating media, and a channel 119 for delivering the lubricating media from the reservoir 111 to the valve 120. Most embodiments also include at least one attachment member 115 for attaching the body 110 to the vehicle 101.

Figure 5:
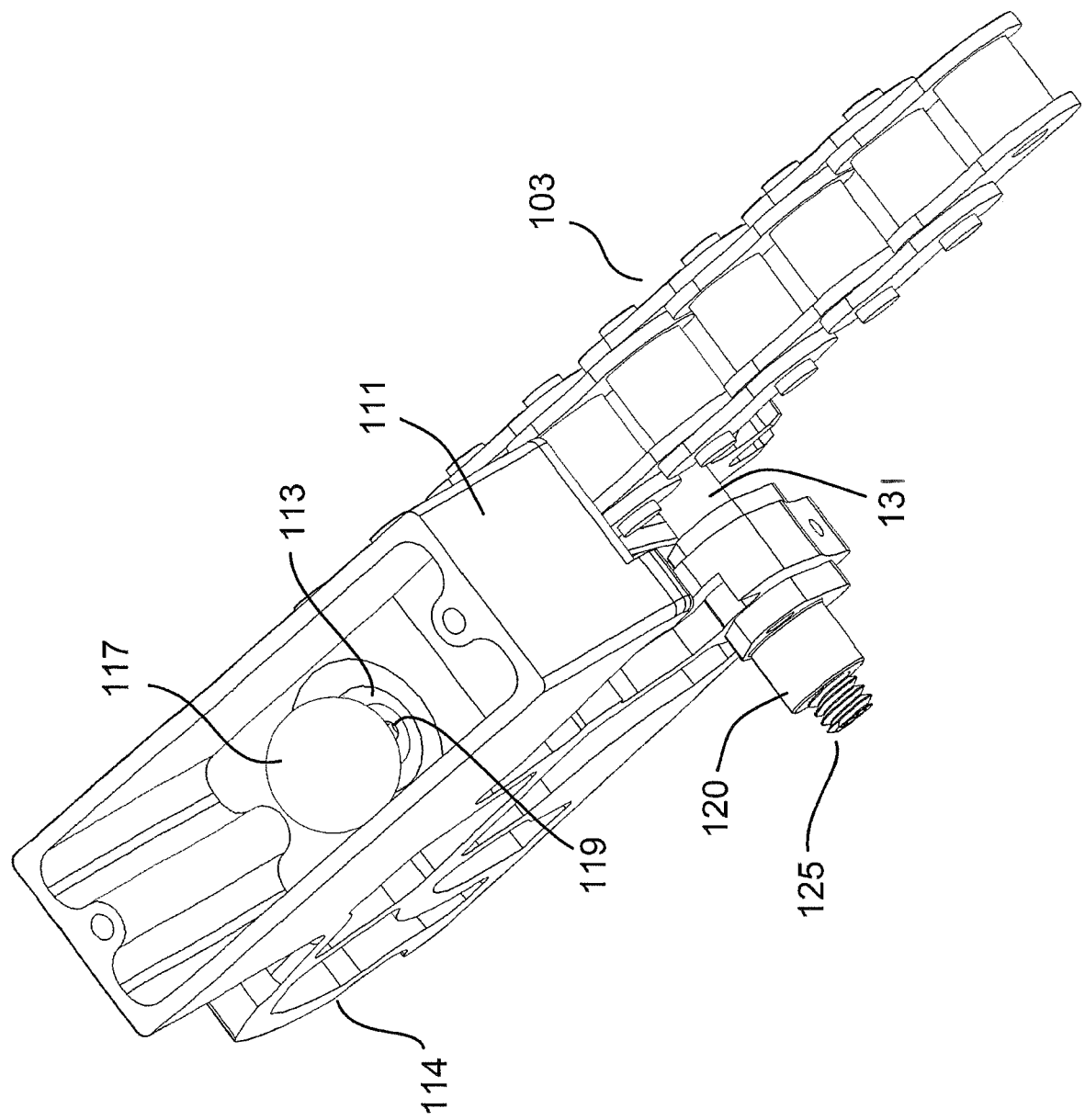
FIG. 5 shows a top, perspective view of an apparatus for lubricating a drive chain and drive sprocket of a chain-driven vehicle, according to an embodiment of the present invention, wherein the cover for the reservoir has been removed.

The illustrated exemplary body 110 may comprise a reservoir 111 for holding a volume of lubricating media shown in the top view of FIG. 5. The reservoir 111 may comprise an inlet 112 for accepting lubricating media (e.g., an opening in the top of the reservoir 111 for pouring lubricating media into the reservoir 111) and an outlet 113 in fluid communication with the channel 119 (i.e., an opening in the bottom of the reservoir 111 leading to the channel 119). The reservoir 111 may comprise a substantially cubic shape having a height and width substantially greater than a depth (i.e., a rectangular polyhedron).

The illustrated exemplary reservoir 111 may comprise a removable lid 116 for providing access to the interior of the reservoir 111, wherein the inlet 112 is located in the lid 116. Removal of the lid 116 (see FIG. 5) may allow for installation or removal of a governing device 117 (check valve) from the reservoir 111. The governing device 117 is illustrated as a sphere which sits freely in the reservoir 111, although any other suitable check valve mechanism may be used. The governing device 117 may be operable to limit the flow of lubricating media through the outlet 113 by creating a seal with the outlet 113, which may comprise a round orifice. The governing device 117 may thus be operable to limit the flow of lubricating media delivered to the valve 120 and subsequently to the drive sprocket 102 via the applicator 130.

The illustrated exemplary outlet 113 may be positioned at a low point of the reservoir 111 such that gravity pulls the governing device 117 into a nesting position with the outlet 113. The governing device 117 may then be knocked out of the sealed, nesting position during operation of the vehicle 101 due to bumps, vibrations and an uneven ride, allowing a limited amount of lubricating media to be exit the reservoir 111 and be delivered to the drive sprocket 102 during operation. The governing device 117 may thus be operable to prevent the flow of the lubricating media while the vehicle 101 is not in operation (i.e., when a flow of lubricating media is not needed), and allow the flow of the lubricating media during operation of the vehicle 101 (i.e., when lubricating media is beneficial for the drive sprocket 102 and chain 103), using only the force of gravity and the vibration of the vehicle 101 to control the position of the governing device 117.

The illustrated exemplary body 110 may further comprise a sprocket cover 114 operable to shield at least a portion of a sprocket 102 and chain 103 of the vehicle 101 from contact with wind, and with foreign objects such as contaminants, bugs, the user's body or clothing, and other similar objects. The illustrated exemplary sprocket cover 114 of FIGS. 1-5 may shield at least substantially the upper half of the drive sprocket 102, including the portion of the drive sprocket 102 to which the applicator 130 applies lubricating media. The sprocket cover 114 may thus also act as a shield against excess lubricating media being flung off of the drive sprocket 102 and/or drive chain 103, keeping the lubricating media from depositing on other parts of the vehicle 101 or onto the user or the user's clothing. The sprocket cover 114 may encompass the channel 119 (see FIG. 2) and may support the attachment member(s) 115, valve 120, and applicator 130.

Figure 6B:
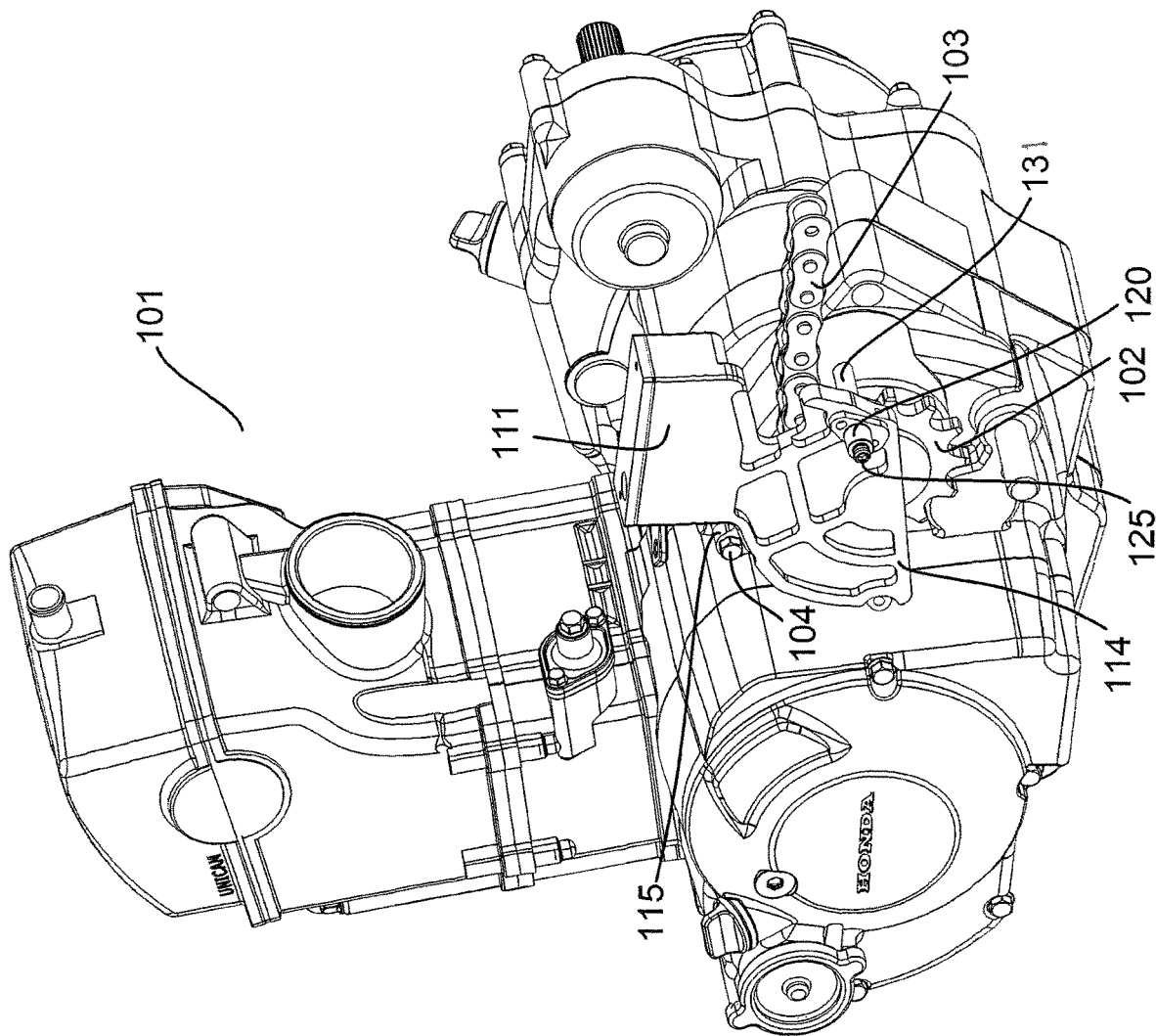
FIG. 6B shows a perspective view of an apparatus for lubricating a drive chain and drive sprocket of a chain-driven vehicle, according to an embodiment of the present invention installed on the vehicle of FIG. 6A.

The illustrated exemplary attachment member(s) 115 may comprise a plurality of bolt holes without a threading that are positioned to correspond to existing bolt hole(s) 101a of the vehicle. Bolt holes 115 may have a diameter substantially similar to the existing corresponding bolt hole(s) 101a (see FIG. 6A, wherein the system 100 is not installed on the vehicle 101 for clarity). A threaded body of a bolt 104 (see FIG. 6B) may therefore be passed through a bolt hole 115 and threaded into the corresponding bolt hole 101a of the vehicle 101. As seen in FIG. 6B, when an attachment member 115 is aligned with an existing bolt hole 101a of the vehicle 101, a bolt 104 may be threaded through the attachment member 115 and into the existing bolt hole 101a, securing the body 110 to the vehicle 101. In alternative embodiments, one or more of bolt holes 115 may also be threaded such that a bolt 114 may be threaded first into the threaded bolt hole 115 of the body 110, and then threaded into the existing bolt hole 101a of the vehicle for secure attachment.

Figure 8:
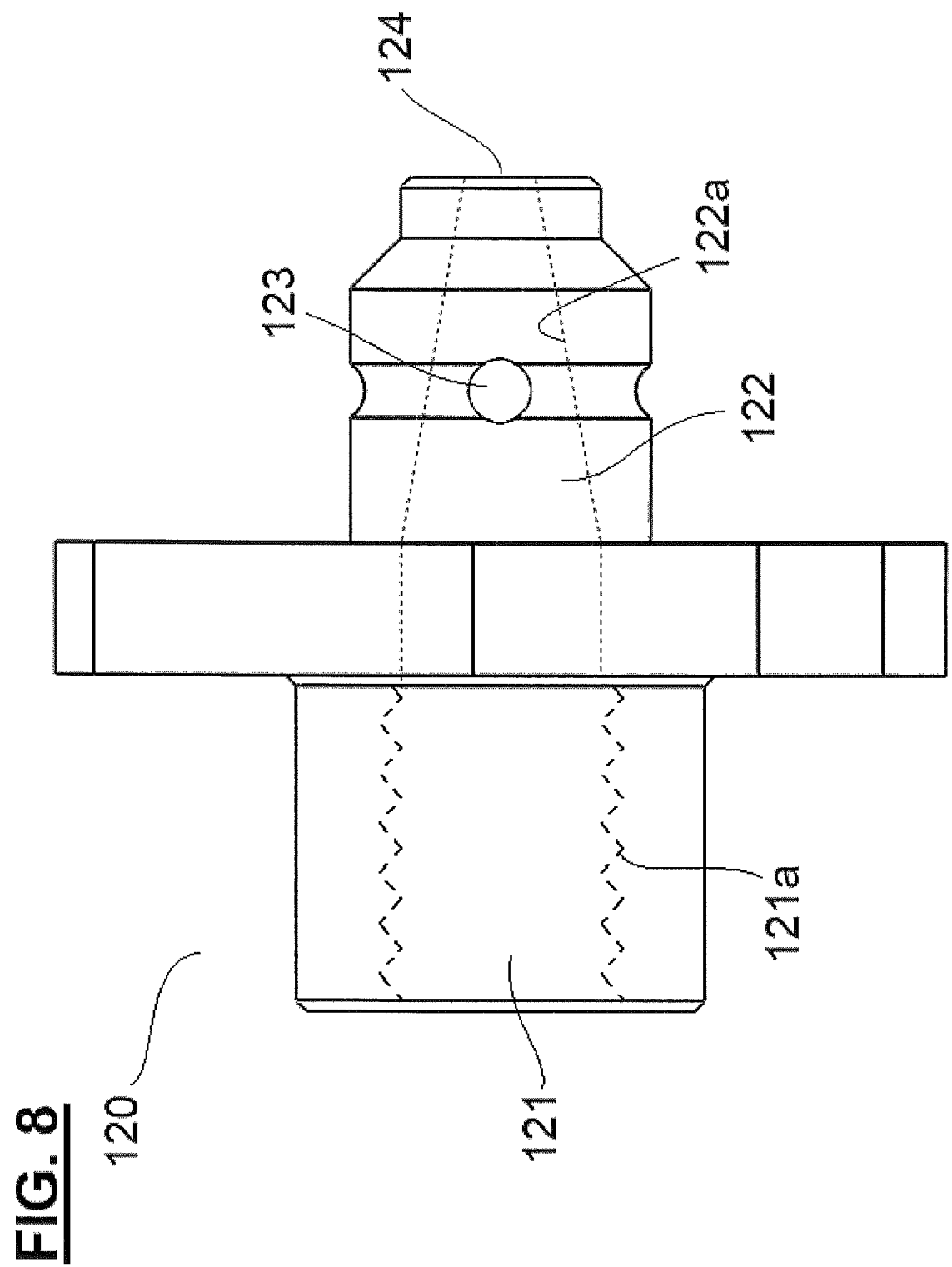
FIG. 8 shows a side view of a valve of an apparatus for lubricating a drive chain and drive sprocket of a chain-driven vehicle, according to an embodiment of the present invention.

The illustrated exemplary valve 120 may comprise a needle valve allowing for adjustment of a flow of lubricating media being delivered to the drive sprocket 102 without the need to communicate with or otherwise utilize a power system of the vehicle 101. The valve 120 may have an adjustment member 125 which is accessible by hand while the user is operating, occupying, or standing next to the vehicle. As seen in FIG. 7, the adjustment member 125 may comprise a bolt having an adjustment head 126, a threading 127, and a valve end 128. The adjustment head 126 may comprise a six-sided depression adjustable via a hex key or Allen wrench, or some other suitable configuration. The threading 127 of the adjustment member 125 may have a shape which is complementary to a shape of a threading 121a of a passage 121 (see FIG. 8) in the valve 120 the passage 121 being in communication with a conical valve chamber 122. The valve chamber 122 may be in communication with the channel 119 via an inlet 123, and in communication with the applicator 130 via an outlet 124. The valve end 128 of the adjustment member 125 may comprise a conical shape which is complementary to the shape of the valve chamber 122, the valve end 128 being operable to make contact with the wall 122a of the valve chamber 122, thereby closing off the inlet 123 and the outlet 124 in order to cut off a flow of the lubricating media through the valve 120.

It is to be appreciated that in other embodiments, different valves may be used to control the flow of lubricant between the reservoir and the applicator(s). For example and without limitation, a rotatable valve, slide valve, pinch valve or other suitable valves may be used. In alternative embodiments, valve 120 may have an electronic actuator such as, for example and without limitation a solenoid or a motor. Such an actuator may be electronically operated from a switch or control provided at a location that is accessible to the operator during use, such as on the vehicle body, dashboard display or handle bars.

Embodiments of valve 120 may be designed to be easily attached to body 110 for easy removal and replacement for repair and maintenance.

Figure 4A:
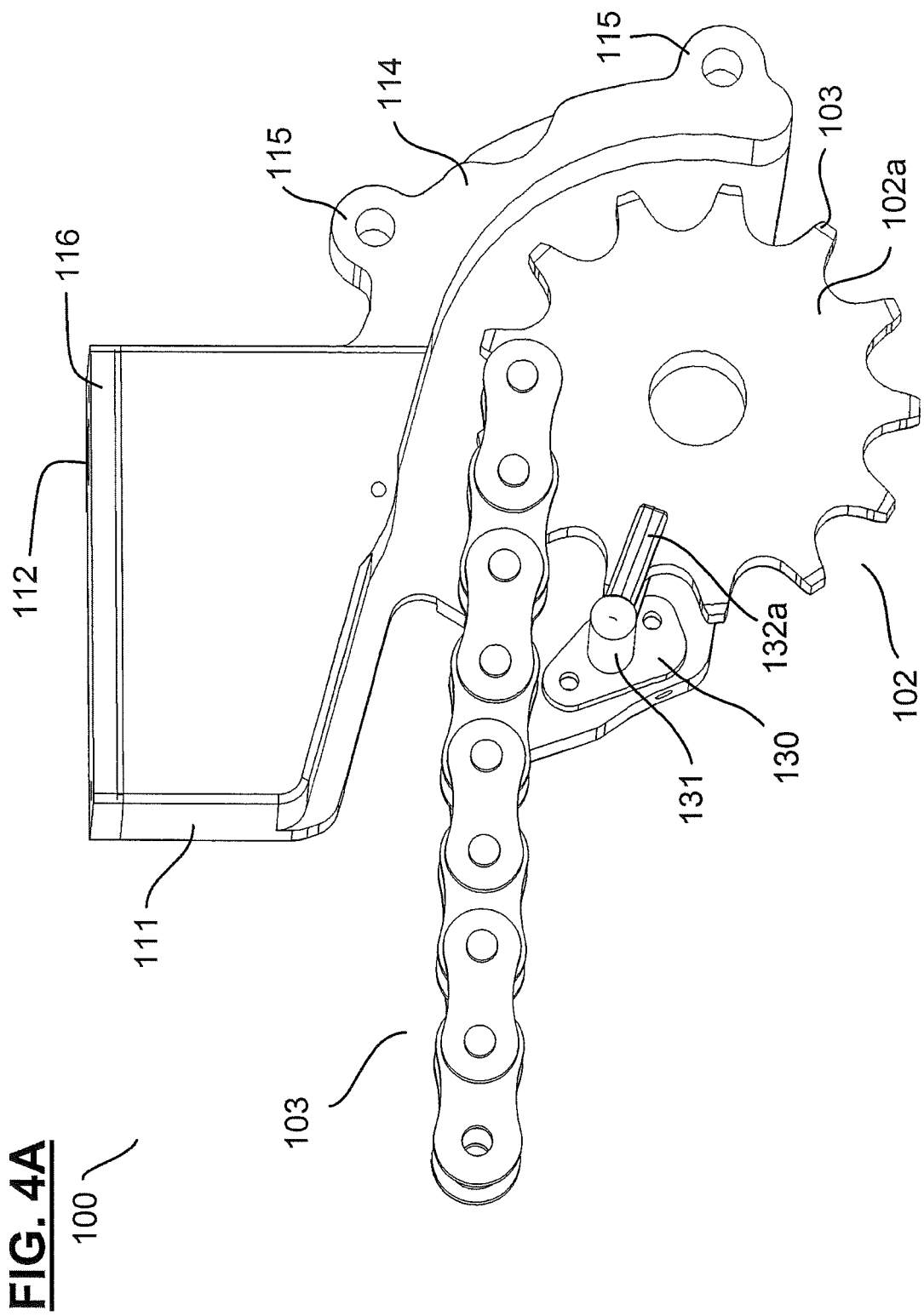
FIG. 4A shows an opposite side perspective view of an apparatus for lubricating a drive chain and drive sprocket of a chain-driven vehicle, according to an embodiment of the present invention.
Figure 4B:
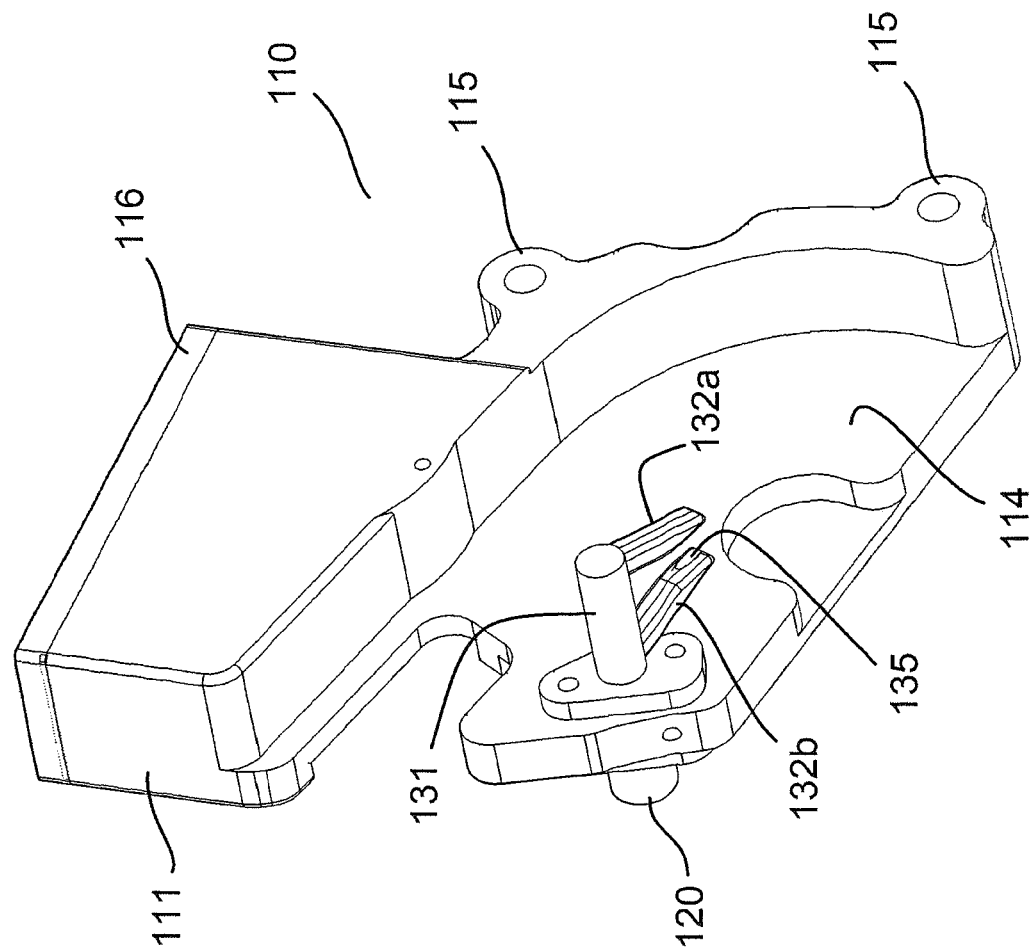
FIG. 4B shows a modified perspective view of the embodiment of FIG. 4A wherein the chain and sprocket have been removed.

The illustrated exemplary applicator 131 may comprise a passage in fluid communication with the chamber of the valve 120 and may have a one or more distal openings 135 positioned adjacent to or in contact with one or more surfaces (e.g., a proximal surface 102a and a distal surface 102b) of the drive sprocket 102. As best seen in FIG. 4B (wherein the sprocket and chain of the vehicle are removed for clarity), the illustrated applicator 131 may comprise a rigid base 130 for securing the applicator to the sprocket cover 114 of the body 110. The illustrated applicator has a forked shape having a first applicator tip 132a and a second applicator tip 132b, each comprising distal openings 135.

The first applicator tip 132a may thus apply lubricating media to the proximal surface 102a of the drive sprocket 102, and the second applicator tip 132b may apply lubricating media to the distal surface 102b of the drive sprocket 102. During operation of the vehicle 101, as the drive sprocket 102 rotates, such lubricating media on each of the proximal 102a and distal 102b surfaces will be forced outwardly to each tooth 102c of the drive sprocket 102, and subsequently onto each link of the drive chain 103 of the vehicle 101. The first and second applicator tips 132a, 132b may each comprise a deformable material which is non-damaging to the drive sprocket 102 due to contact therewith.

In other embodiments, the applicator 131 may have a single deformable tip 132 having a single opening 135 provided on one side of the drive sprocket 102. During operation of the vehicle 101, as the drive sprocket 102 rotates, the lubricating media on the surface (102a or 102b) of the drive sprocket 102 will be forced outwardly to the teeth 102c of the drive sprocket 102, and subsequently onto each link of the drive chain 103 of the vehicle 101.

Embodiments of the applicator 130 may be designed to be easily attached to body 110 for easy removal and replacement for repair and maintenance.

As shown in FIG. 9, in another embodiment of the present invention, the apparatus 200 may comprise a sprocket cover 214 having a larger substantially circular shape operable to cover substantially all of the drive sprocket 102, further shielding the drive sprocket 102 and drive chain 103 from contact with foreign objects.

In use, a body 114 supporting a reservoir 111 is attached to a vehicle in the vicinity of the main drive sprocket 102 using bolts or other means 115 that correspond to existing bolt holes 101a of the vehicle. A valve 120 and applicator 131 are attached to the body and engaged adjacent to the drive sprocket. An operator may then fill the reservoir 111 with lubricating fluid through inlet 112. A check valve 117 prevents lubrication from exiting through channel 119 until it is jostled out of position from motion of the vehicle. This motion causes lubrication to flow from reservoir 111 through channel 119 to valve 120.

Valve control 125 is adjusted to limit the amount of lubrication that is allowed to pass through valve 120 to the applicator 131. Control 125 may be adjusted to shut off all lubrication from reservoir 111 if, for example, the vehicle is to be stored for a long period of time. Control 125 may be adjusted before or during driving to allow a small trickle of lubrication to pass through valve 120 if the vehicle is intended to be used in normal road and highway environments. Control 125 may be adjusted before or during driving to allow a larger flow of lubricant for harsh, dusty, dirty or wet environments where additional lubrication may be needed. In alternative electronically actuated valves, control 125 may be adjusted from a control on the vehicle, dashboard or handlebars as needed before or during operation.

The lubrication passes from valve 120 to applicator 131 which may have a rigid base 130 and one or more deformable tips 132 and openings 135 which deposit the lubricant onto a surface of the drive sprocket 102. Centrifugal force in the rotating sprocket causes the lubrication to move outward toward the sprocket teeth 102c at the outside edges of the sprocket. This same force transfers the lubrication from the sprocket teeth to the chain 103 where it is transferred to any other sprocket teeth that the chain comes into contact with. Additional lubrication may be introduced through applicators that may be provided on both sides of the sprocket 102.

This arrangement of components provides efficient, reliable and uniform distribution of lubrication to the drive sprocket and chain.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An apparatus for lubricating a drive chain of a vehicle comprising:
   a. a body comprising a shield for covering a portion of a drive sprocket and chain of the vehicle, said body having an interior reservoir therein for holding a lubricating media;
   b. an applicator for delivering said lubricating media to a sprocket of said vehicle; and
   c. an internal channel in said body for providing fluid between an outlet of said reservoir and
   an adjustable valve on said applicator, said valve controlling a flow of said lubricating media from said reservoir to said applicator.

2. The apparatus of claim 1 wherein said applicator comprises a single tip having at least one opening thereon adjacent to one side of said sprocket.

3. The apparatus of claim 1 wherein said applicator comprises a first tip having at least one opening thereon for delivering said lubricating media to a proximal surface of said sprocket, and a second tip having at least one opening thereon for delivering said lubricating media to a distal surface of said sprocket.

4. The apparatus of claim 3 wherein said lubricating media is transferred from said reservoir to said drive sprocket via gravity.

5. The apparatus of claim 3 wherein said lubricating media is transferred from said sprocket to said chain via centrifugal force.

6. The apparatus of claim 3 wherein said body further comprises at least one opening corresponding to at least one bolt hole on said vehicle, and at least one bolt for attaching said body to said vehicle through said at least one opening and bolt hole.

7. The apparatus of claim 6 wherein said at least one bolt and said at least one vehicle bolt hole have complementary threading, and said at least one opening has no threading.

8. The apparatus of claim 6 wherein said at least one bolt, said at least one vehicle bolt hole and said at least one opening have complementary threading.

9. The apparatus of claim 1 wherein said reservoir comprises a drain having a governing device.

10. The apparatus of claim 9 wherein said governing device comprises a sphere, said sphere sitting freely in said reservoir.

11. The apparatus of claim 1 wherein said valve further comprises a control selected form the group of: a globe valve, a butterfly valve, a gate valve, a ball valve, a needle valve, a pinch valve, a diaphragm valve, a plug valve.

12. The apparatus of claim 1 wherein said valve is operable by hand and positioned such that it is accessible without the need to open or remove any other parts of the vehicle.

13. A method of lubricating chain driven vehicle comprising the steps of
   a. attaching to said vehicle a body comprising a shield for covering a portion of a drive sprocket and drive chain of the vehicle, said body having an interior reservoir therein for holding a lubricating media;
   b. placing an applicator for delivering said lubricating media adjacent to a drive sprocket of said vehicle;
   c. connecting an internal channel in said body to an adjustable valve on said applicator;
   d. adding lubricating media to said reservoir;
   e. adjusting said valve to a desired position; and
   f. operating said vehicle.

14. The method of claim 13, wherein said applicator comprises a plurality of extensions for dispensing said lubricating media to an outer side and an inner side of the drive sprocket of said vehicle.

15. The method of claim 14, wherein said lubricating media is transferred from the reservoir to said applicator, and from said applicator to said drive sprocket, by force of gravity.

16. The method of claim 14, wherein said lubricating media is transferred from said inner side and said outer side of said drive sprocket to the drive chain of said vehicle via centrifugal force.

17. The method of claim 13, wherein said reservoir comprises a flow governor, said flow governor forming at least a partial barrier to said lubricating media passing into said channel.

18. A gravity operated, bolt-on apparatus for lubricating a drive chain of a motor vehicle comprising:
   a. a body containing a shield for covering a portion of a drive sprocket and drive chain of the vehicle, said body having an interior reservoir for holding lubricating oil;
   b. a drain in said reservoir leading to an internal channel in said body in fluid communication with an applicator;
   c. a check valve over said drain for preventing a flow of said oil from said reservoir while said vehicle is at rest; and
   d. a valve adjacent to said applicator for controlling the amount of oil reaching said applicator;
wherein said applicator comprises a pair of tips, one on either side of a drive sprocket of said vehicle, each tip having at least one opening therein for delivering said oil via gravity to one side of said drive sprocket, said oil being transferred to said drive chain via centrifugal force during operation of the vehicle.

* * * * *